United States Patent [19]
Tepper

[11] 3,887,277
[45] June 3, 1975

[54] APPARATUS FOR REMOTELY CONTROLLING A SLIDE PROJECTOR

[75] Inventor: Charles William Tepper, Rochester, N.Y.

[73] Assignee: Eastman Kodak Company, Rochester, N.Y.

[22] Filed: June 14, 1974

[21] Appl. No.: 479,322

[52] U.S. Cl. ............................ 353/103; 353/122
[51] Int. Cl. ..................................... G03b 23/00
[58] Field of Search ..................... 353/103–117, 353/122, 85

[56] References Cited
UNITED STATES PATENTS

| | | | |
|---|---|---|---|
| 2,748,653 | 6/1956 | Pollan | 353/107 |
| 3,078,763 | 2/1963 | McCammon | 353/85 |
| 3,276,314 | 10/1966 | Robinson | 353/107 |
| 3,411,845 | 11/1968 | Pester | 353/107 |
| 3,837,740 | 9/1974 | Johnson | 353/122 |

Primary Examiner—Richard E. Aegerter
Assistant Examiner—A. J. Mirabito
Attorney, Agent, or Firm—D. P. Monteith

[57] ABSTRACT

Remote control apparatus connected to a slide projector through a multi-conductor cable includes an electronic control network, and a two-position selector switch selectively connectable to the control network through a one of the conductors so that two projector operational functions can be remotely controlled over that one conductor. When the switch is in its first position, a first control circuit is closed and due to a first pair of control diodes in series therein responds to a particular half cycle of an alternating electrical signal to cause a current signal to flow in one direction through that one conductor to energize a projector control relay, which interrupts power to the projector. When the switch is moved from its first position, the relay is de-energized so that power is applied to the projector. When the switch reaches its second position a second control circuit is enabled so that actuation of a focus control switch is effective to supply current to a projector focus control motor. Due to the orientation of a second pair of diodes interconnected in series in the second circuit, a current signal is caused to flow in the opposite direction through that one conductor and to turn an electronic switching element such as a triac ON. This latter condition causes a projector autofocus control circuit connected in series to the triac to be locked-out or overridden.

6 Claims, 2 Drawing Figures

APPARATUS FOR REMOTELY CONTROLLING A SLIDE PROJECTOR

BACKGROUND OF THE INVENTION

1. Field of the Invention

This invention relates to automatic slide projectors, and more particularly to an electronic circuit for a control unit for remotely controlling such a projector.

2. Description of the Prior Art

Control units are known in the art which permit an operator to control an automatic slide projector at a position remote from the location of the projector. Remote control units permit the operator to present a slide show particularly adapted to suit the viewers. The operator can be positioned so as not to obstruct the view of the audience as well as near the projector screen to point out areas of interest in the projected scenes while at the same time directing commentary to the audience.

Slide projectors presently being marketed include a varied selection of projector control options which are available to the operator to improve the ease of operating the projector as well as the quality of a slide presentation. Projector control options include forward and reverse slide carriage control and fully automatic and manually selective focus forward and reverse operations. Examples of slide projectors having such control options are the Kodak custom Carousel model 860H projector and the Kodak Ektagraphic model AF2 projector which are manufactured by the assignee of the instant invention.

To enable the projector operator to remotely control each of the projector control functions, a remote control switching unit is coupled through a low voltage multiple conductor cable which contains as many electrical conductors as there are projector functions that are remotely controllable plus one common conductor. With this arrangement, each conductor, except for the common conductor, connects the remote switching unit to a particular projector control circuit. An accepted design used in some equipment sold by the Eastman Kodak Company is to interconnect the remote switching unit to the projector through a cable having five electrical conductors, such a design sometimes being referred to in the slide projector industry as the 5-line projector unit. With a common generally known design manufacturers of accessory projector equipment are readily able to manufacture remote switching units for 5-line projector units. Specialized designs for accessory equipment for 5-line projectors made by different manufacturers can be avoided with an attendant reduction in development and manufacturing costs that can be passed on to the consumer and other users of slide projectors.

In the projector unit for either the aforementioned Kodak custom Carousel model 860H projector or Kodak Ektagraphic model AF2 projector, 5-line remote control units are available for controlling the projector wherein (1) one conductor is used for a slide forward operation; (2) a second conductor is used for a slide reverse operation; (3) a third conductor is utilized for an autofocus override operation to permit; (4) a fourth conductor to be used for a selectively controlled manual forward or reverse focus change; and (5) the fifth conductor is used as a common wire to complete the control circuit for each of the previous four conductors.

However, in order to be able to remotely control slide projectors having the aforementioned control options with the 5-line projector unit, it has not been possible with existing 5-line control units to remotely control power to the slide projector while maintaining all of the aforementioned remote control functions. It is still necessary for the operator to switch projector power ON and OFF such as by actuating a switch located on the exterior of the projector.

SUMMARY OF THE INVENTION

One of the objects of the present invention is to provide an improved control unit for remotely controlling an automatic slide projector.

A further object of the invention is to provide a control unit for remotely controlling a slide projector, which unit contains the capability of switching line power ON and OFF to the projector.

A still further object of the present invention is to provide an improved 5-line remote control unit having power ON/OFF remote control capability and which includes all available projector remote control options presently being used with the 5-line unit.

A still further object of the instant invention is to provide a slide projector remote control unit connected to the projector over a multiple-conductor cable in which a single conductor can be shared to effect two remote projector control functions.

In accordance with the above objects, there is provided a remote control unit for an automatic slide projector having operatable switch means for applying an alternating electrical input signal thereto and means energizable for effecting a particular projector control operation, and an electrical cable having at least one conductor interconnecting the projector and the control unit, the control unit comprising switch means connected to that one conductor and selectively movable between first and second switch positions, and electrical circuit means operatively associated with the switch means, the electrical circuit means having means defining a first control circuit when the switch means is in its first position responsive to a particular polarity of the alternating signal for actuating the operatable switch means to interrupt projector power and means defining a second control circuit when the switch means is in its second position for enabling the energizable means to be energized.

The invention, and its objects and advantages, will become more apparent in the detailed description of a preferred embodiment presented below.

BRIEF DESCRIPTION OF THE DRAWINGS

In the detailed description of a preferred embodiment of the invention presented below, reference is made to the accompanying drawing, in which.

DESCRIPTION OF A PREFERRED EMBODIMENT

Because slide projectors are well known, the present description will be directed in particular to elements forming part of, or cooperating more directly with, apparatus in accordance with the present invention. It is to be understood projector elements not specifically shown or described may take various forms well known to those having skill in the art.

Figure 1:
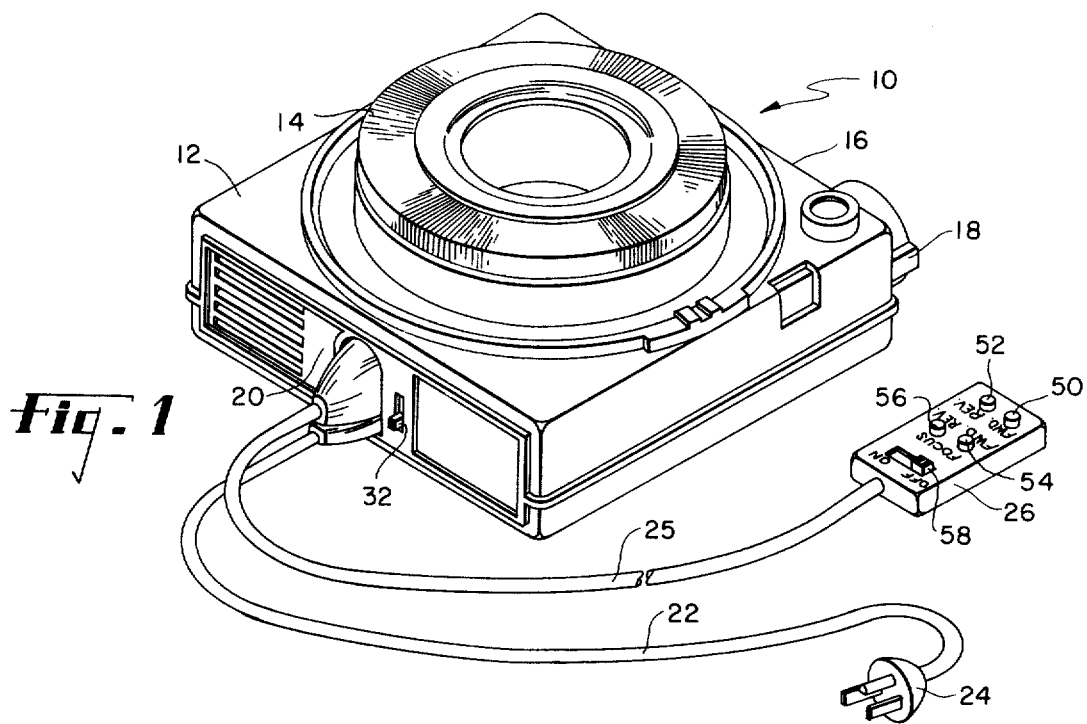
FIG. 1 illustrates a perspective view of a complete slide projector unit including the projector, a remote control unit for controlling the projector and a connecting cable.

The slide projector 10 presented in FIG. 1 comprises an enclosed housing 12 upon which is rotatably mounted a circular slide tray 14 and from the front wall 16 of which projects a lens barrel 18 which is movable for focusing a lens mounted therein through which image light is projected onto a remote surface to be viewed. Extending from the back wall 20 is a power cable 22 having a plug 24 for applying a standard 120 volt 60 cycle electrical signal to the projector. Also extending from wall 20 is a multi-conductor cable 25 for electrically connecting a projector remote control unit 26 to projector 10.

Figure 2:
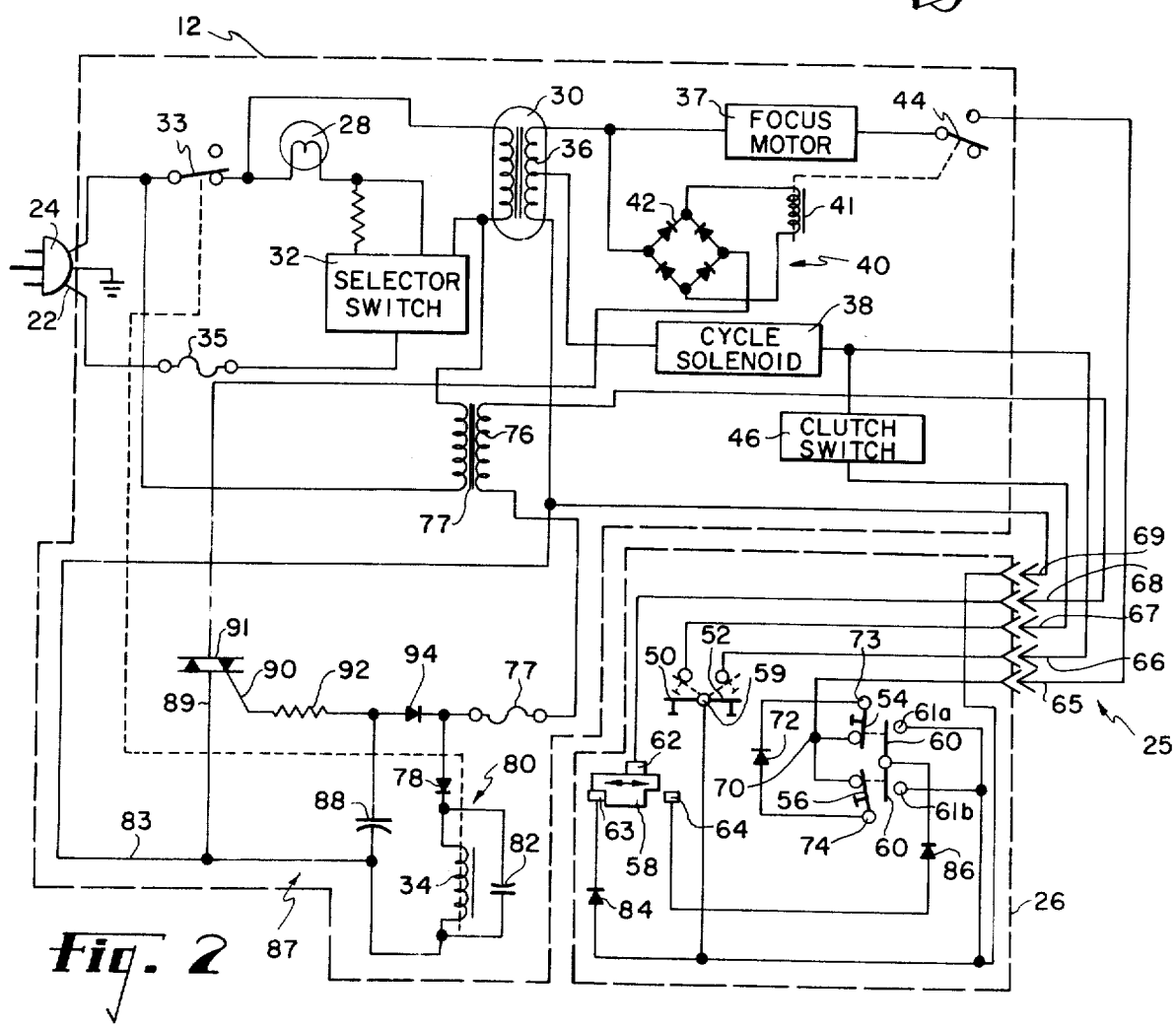
FIG. 2 is a schematic of the electrical control circuit in accordance with the teachings of this invention for controlling the projector with the remote control unit shown in FIG. 1.

As is shown in FIG. 2, housing 12 contains a projector lamp 28, a slide indexing drive motor 30, and a projector selector switch 32 for controlling power to the lamp and to a projector fan (not shown) which is operably coupled to the drive motor and operates to prevent the lamp from excessively heating the slides and associated control circuitry. Selector switch 32 functions as a power override switch and must be in its power ON position to enable the projector control circuits to be energized. When projector 10 is turned ON, drive motor 30 runs continuously and transfers power to the fan by means of a drive belt (also not shown). Connected in electrical series with power cable 22 to remotely control power to drive motor 30 and the lamp is actuatable means such as a relay 33, the contact of which assumes the position shown in FIG. 2 so as to apply power to the motor and the lamp when relay coil 34, which is under the control of control unit 26, is de-energized. This arrangement provides the additional operator option of permitting the projector drive motor 30 to be operated through selector switch 32 when remote control unit 26 is disconnected. This is desirable when projector 10 is set up and the remote control unit 26 is located at some distance therefrom. Also shown in FIG. 2 connected to power cable 22 is a thermal fuse 35 which acts as a safety device to protect projector 10 from overheating.

Since remote control units for slide projectors typically are in contact with the operator's hands, it is essential from a safety standpoint that low voltage signals be used to carry out the remote control operations. Further, it is desirable that the remote control unit be electrically isolated from projector circuits connected directly to the 120 volt line voltage so that less bulky insulation can be used to insulate the conductors of the interconnecting cable and the control unit. To achieve these objectives, the secondary winding 36 of control motor 30 is utilized to produce a stepped-down alternating voltage signal on the order of 24 volts. As shown, secondary winding 36 is electrically connected to a bi-directional focus control motor 37, a slide carriage cycle solenoid 38, and an automatic focus control circuit designated generally with the numeral 40 and shown, only in part, as comprising a lockout or override solenoid 41 connected to opposed polarity terminals of a rectifier bridge circuit 42. With an arrangement of this type, the control unit 26 is electrically isolated from the 120 volt signal applied to the projector so that flexible, light-weight insulation can be used with cable 25 and the operator, who is in contact with the control unit, is secure from electrical shock with the aforementioned 24-volt signal.

Connected in series to one side of focus motor 37 is a cam lock switch 44 which is under the control of lockout solenoid 41 as is shown diagrammatically in FIG. 2. Lockout solenoid 41 as referred to previously forms part of the projector automatic focus control circuit, which circuit is of the type, along with the projector automatic focus control mechanism (not shown), that is known in the art and for that reason is not shown or described in its entirety. When lockout solenoid 41 is energized, cam lock switch 44 is actuated to electrically connect focus motor 37 through cable 25 to control unit 26. When this condition occurs, the automatic focus control mechanism is overridden and remote control unit 26 functions to effect the focus control operation under operator control as explained in detail hereinafter.

Cycle solenoid 38 in combination with clutch switch 46 forms the electrical control for a slide tray indexing mechanism (not shown) which functions to drive slide tray 14 in forward and reverse directions and a slide pickup mechanism (also not shown) for positioning a slide relative to the projector focal plane to be illuminated by lamp 28. Mechanisms of this type and descriptive details of the control circuit therefor are described in U.S. Pat. Nos. 3,236,113 issued Feb. 22, 1966 in the names of H. T. Robinson et al, and 3,319,370, issued May 16, 1967 in the name of H. T. Robinson, which patents are both assigned to the assignee of the instant invention and the disclosures of which are incorporated herein by reference.

As is shown in FIG. 1, control unit 26 carries two slide carriage control push buttons 50 and 52, one button for indexing slide tray 14 in the forward direction in a stepwise manner to effect forward slide control and the other button for indexing the slide tray in the opposite direction for reverse slide control, a forward and a reverse focus control push button 54, 56, respectively, and a slidable selector button 58 which in accordance with the teachings of this invention operates in a first position to interrupt projector power and functions in a second position to permit a remote manual focus control operation to occur under the control of push buttons 54 and 56. The two slide carriage control push buttons 50 and 52 act to separately and independently engage a mutual contact 59 to complete the forward and reverse slide carriage control circuits, respectively; the focus forward and focus reverse push buttons 54 and 56, respectively, are positioned relative to opposing half portions of a contact 60, as is diagrammatically shown in FIG. 2, each half of which is respectively located in a normally open position relative to a pair of terminals 61a, 61b such that actuation of push button 54 or 56 causes that push button actuated to be electrically coupled to terminal 61a or 61b, respectively, through contact 60; and selector button 58 functions to connect terminal 62 to either terminal 63, which condition interrupts line power to the projector, or terminal 64, which condition enables the projector automatic focus control circuit to be overridden as explained in detail hereinbelow.

Remote unit connecting cable 25 contains the standard 5-line arrangement referred to hereinbefore and comprises the five conductors 65, 66, 67, 68 and 69. Conductor 65 forms a portion of the manual focus motor drive circuit and functions to permit a remote manual focus change to occur by connecting a terminal 70 operatively coupled to push buttons 54 and 56 in series with cam lock control switch 44. A control diode 72 connected between contacts 73 and 74 in the focus motor circuit as shown in FIG. 2 functions to rectify the low voltage signal appearing across motor secondary winding 36 to a half-wave alternating signal and to control which half portion of that alternating signal is applied to focus drive motor 37. It shall be appreciated that whether push button 54 or 56 is actuated determines which polarity of the alternating signal is applied to focus drive motor 37 and, consequently, the direction of current flow therethrough and correspondingly, the direction lens barrel 18 moves relative to the projector focal plane. By way of example, assume focus reverse button 56 is actuated. When this happens, terminal 74 is electrically connected to terminal 61b through contact 60. When this condition occurs a series connection exists from terminal 70 through the contact for push button 54 to terminal 73 and from the cathode to anode of control diode 72 through terminal 74 and the contact for push button 56 to terminal 61b. With this connection and orientation of diode 72, current is caused to flow in the direction from terminal 74 through diode 72 to terminals 73 and 70 then through focus motor 37 to drive the latter in a reverse focus direction. By way of a further example, actuation of focus forward push button 54 causes a focus motor control circuit to be closed wherein diode 72 is oriented so that focus drive current is caused to flow through focus motor 37 in the opposite direction and lens barrel 18 is moved in a focus forward direction. It shall be understood, of course, that for current to flow through the focus drive motor in either direction, switch 44 must be closed by energizing solenoid 41.

To meet the objective that the standard number of remote control conductors remain unchanged while all existing remote control operations remain along with the additional desired remote control operations of power interrupt and power restoration, one conductor must be used for both the remote power control operation and one of the existing control operations. This objective is accomplished by using unidirectional semiconductor devices to produce negative AC power for one function and positive AC power for the other function, with both signals being transmitted over the same conductor, which in accordance with a preferred embodiment is conductor 68.

The electrical control circuit unit coupled to conductor 68 and constituting the principal part of the instant invention will be readily understood by those skilled in the electronics art from the following description read in conjunction with FIG. 2 of the drawings.

Selector switch 58 is connected to the secondary winding 76 of voltage step-down transformer 77 through conductor 68 as shown. The output voltage produced across secondary winding is selected to be of a magnitude to enable the remote control operation to control projector 10, while meeting the aforementioned objectives of operator safety and light-weight electrical insulating materials for cable 25. When switch 58 is positioned in its OFF position, shown in FIG. 2, a control circuit is closed, which consists of secondary 76, a fuse 77, a diode 78, a tank circuit 80 comprising relay coil 34 in parallel with a capacitor 82, along a conductor 83 to the common conductor 69 and through a diode 84 and united terminals 63 and 62, the conductor 68 and back to the secondary winding. This circuit interrupts or turns OFF the line voltage to lamp 28, motor 30 and associated projector control circuits and operates as follows: Because of the orientation of diodes 78 and 84, current is caused to flow through the circuit during the half cycle of the line voltage when the terminal of winding 76 connected to fuse 77 has a positive voltage potential with respect to the opposite terminal thereof in the direction from secondary winding 76 through diode 78, into tank circuit 80 thereby charging capacitor 82 and energizing relay coil 34, through diode 84, switch 58 and through conductor 68 back to the transformer secondary. When coil 34 is energized relay contact 33 opens to thereby interrupt line power to drive motor 30 and lamp 28. During the opposite half cycle of the line voltage when diodes 78 and 84 are not conducting, capacitor 82 discharges through coil 34 to maintain relay contact 33 in its power interrupt position.

Energization of focus drive motor 37 through conductor 65 will now be considered. When selector switch 58 is moved from its OFF position to its ON position, the aforementioned relay control circuit is immediately opened and relay coil 34 is de-energized, which condition causes relay contact 33 to assume its closed position and to thereby restore power to slide selector motor 30 and lamp 28. When selector switch 58 reaches its ON position and assuming that either focus forward switch 54 or focus reverse switch 56 is also actuated so that one of the two contacts 60 is connected to either terminal 61a or 61b, a control circuit is closed through transformer secondary 76, along conductor 68, through united contacts 62 and 64, a diode 86, a one of the contacts 60 and either terminal 61a or 61b, common conductor 69 to conductor 83, through a tank circuit 87 comprised of a capacitor 88 connected in parallel across the main terminal 89 and gate electrode 90 of a triac 91, a gate electrode being connected in series to a current limiting resistor 92, a diode 94 which is connected to resistor 92 as shown, fuse 77 and back to the secondary transformer winding. This latter circuit locks out or overrides the projector automatic focus control circuit (which is one of the existing remote control functions) to permit an operator controlled focus change to occur through conductor 65 and operates as follows: Because of the presence and the orientation of diodes 86 and 90, current is caused to flow through the circuit during the half cycle of the line voltage when the terminal of winding 76 connected to conductor 68 is at a positive voltage potential relative to the opposite terminal thereof. In so doing, current flows in the direction from secondary 76 along the conductor 68 through switch 58, diode 86 and contact 60, along the common conductor 69 and conductor 83, into tank circuit 87, thereby charging capacitor 88 and causing triac 91 to conduct, through resistor 92 and diode 94 back to the transformer secondary. When triac 91 conducts or is turned ON, lockout solenoid 41 is energized and cam lock switch 44 is switched into its closed position. When this happens, focus control motor 37 drives the focusing lens in a direction determined by whichever of the switches 54 and 56 is actuated as described previously herein. During the opposite half cycle of the line voltage when diodes 86 and 90 are not conducting capacitor 88 discharges through main terminal 89 and gate electrode 90 to thereby maintain the triac ON and, consequently, lockout solenoid 41 energized.

Note that when switch 58 is in its ON position and current is charging capacitor 88 and causing triac 91 to conduct, diode 78 prevents current from flowing through relay coil 34 and contact 33 is maintained in its closed position.

With the control circuitry constituting the instant invention, both the new remote power control operation and the existing autofocus lockout operation are permitted to occur over a single existing interconnecting conductor. With this arrangement, the standard 5-line projector unit is maintained having all existing remote control functions along with the added capability of remote projector power control in accordance with the aforementioned objectives.

The invention has been described in detail with particular reference to a preferred embodiment thereof, but it will be understood that variations and modifications can be effected within the spirit and scope of the invention.

I claim:

1. In an improved control mechanism for remotely controlling an automatic slide projector having operatable means for applying an electrical signal of alternating polarity to said projector and a housing in which is included means energizable for effecting a particular predetermined projector control operation, and an electrical cable having at least one conductor interconnecting the housing and said control mechanism for selectively controlling said projector, said control mechanism compising:
   a. switch means connected to said one conductor leading to said projector and movable into first and second positions; and
   b. electrical circuit means operatively associated with said switch means, said electrical circuit means including means for defining a first circuit when said switch means is in said first position responsive to a particular polarity of the alternating electrical signal for actuating said operatable means to remove electrical power for said projector and means for defining a second circuit when said switch means is in said second position responsive to a polarity of the alternating signal opposite to said particular polarity for enabling said energizable means to be energized so that the predetermined projector control operation can be effected.

2. In an improved remote control mechanism for an automatic slide projector having relay means operatable for applying an electrical input signal of alternating polarity to said projector and a housing in which is included a focusing lens, a focus drive motor selectively energizable to movably position the focusing lens, and means automatically energizable for movably positioning the focusing lens in forward and reverse directions relative to a projector focal plane independent of said focus drive motor, and an electrical cable having at least first and second conductors interconnecting said housing and said remote control mechanism for selectively controlling said projector, said control mechanism comprising:
   a. first switch means connectable to said focus drive motor over said first conductor and movable to a first position to enable current to be supplied thereto in a first direction whereby the focusing lens is moved in a focus forward direction and a second position to enable current to be supplied to said focus drive motor in a second direction opposite to said first direction whereby the focusing lens is moved in a focus reverse direction;
   b. second switch means connected to said second conductor leading to said projector and movable into first and second positions; and
   c. electrical circuit means operatively associated with said second switch means, said electrical control means including means, including said second conductor, for defining a first circuit when said second switch means is in its first position responsive to a signal of one polarity for actuating said operatable means so as to interrupt said electrical signal to said projector and means, including said second conductor, for defining a second circuit when said second switch means is in said second position responsive to a current signal of a polarity opposite to said one polarity for transmitting a control signal to said projector along said second conductor, said control signal having one component for actuating said operatable means to restore said electrical signal to said projector and having a second component for overriding said automatically energizable means so that actuation of said first switch means is effective to supply current to said focus drive motor.

3. In an improved remote control mechanism for an automatic slide projector having relay means operatable for applying an electrical input signal of alternating polarity to said projector and a housing in which is included a focusing lens, a focus drive motor selectively energizable to movably position the focusing lens, and means automatically energizable for movably positioning the focusing lens in forward and reverse directions relative to a projector focal plane independent of said focus drive motor, and an electrical cable having at least first and second conductors interconnecting said housing and said remote control mechanism for selectively controlling said projector, said control mechanism comprising:
   a. a first switch means connectable to said focus drive motor over said first conductor and movable to a first position to supply current thereto in a first direction whereby the focusing lens is moved in a focus forward direction and a second position to supply current to said focus drive motor in a second direction opposite to said first direction whereby the focusing lens is moved in a focus reverse direction;
   b. a selector switch having first and second actuatable positions;
   c. first circuit means including said second conductor energizable when said selector switch is in its first position for producing a control signal to operate said relay means to interrupt power to said projector; and
   d. second circuit means including said second conductor energizable when said selector switch is in its second position for producing a control signal over said second conductor to override said automatically energizable means to enable said focus drive motor to drive the focusing lens in either direction upon actuation of said first switch means.

4. A control mechanism as set forth in claim 3 wherein said first circuit means includes current control means for preventing said relay means from being energized when said second circuit means is energized.

5. A control mechanism as set forth in claim 3 wherein said second circuit means includes means for applying an electrical signal of alternating polarity to said second circuit means, current control means rendering said second circuit means conductive when said electrical signal has a predetermined polarity, electronic switching means having control input means coupled to said current control means for rendering said electronic switching means conductive and nonconductive, and a capacitor coupled to said electronic switching means and adapted to produce a signal to maintain said electronic switching means conductive during time intervals said electrical signal is of a polarity opposite to said particular polarity.

6. A control mechanism as set forth in claim 3 wherein said first circuit means includes means for producing an input signal of alternating polarity, means for rendering said first circuit means conductive when the input signal is of a particular polarity, a parallel circuit in series with said first circuit rendering means, one branch of said parallel circuit comprising the coil of said relay means and another branch of said circuit comprising a capacitor, said capacitor being adapted to produce a signal to maintain said coil energized during time intervals said input signal is of a polarity opposite to said particular polarity.

* * * * *